United States Patent
Chu

(10) Patent No.: US 9,847,667 B2
(45) Date of Patent: Dec. 19, 2017

(54) METHOD OF HANDLING WIRELESS CHARGING AUTHENTICATION

(71) Applicant: HTC Corporation, Taoyuan (TW)

(72) Inventor: Feng-Seng Chu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 346 days.

(21) Appl. No.: 14/619,087

(22) Filed: Feb. 11, 2015

(65) Prior Publication Data

US 2015/0244201 A1    Aug. 27, 2015

Related U.S. Application Data

(60) Provisional application No. 61/944,585, filed on Feb. 26, 2014.

(51) Int. Cl.
| | |
|---|---|
| *H02J 7/02* | (2016.01) |
| *H02J 50/10* | (2016.01) |
| *H02J 50/40* | (2016.01) |
| *H02J 50/80* | (2016.01) |
| *H02J 7/00* | (2006.01) |

(52) U.S. Cl.
CPC .............. *H02J 7/025* (2013.01); *H02J 50/10* (2016.02); *H02J 50/40* (2016.02); *H02J 50/80* (2016.02); *H02J 2007/0001* (2013.01)

(58) Field of Classification Search
None
See application file for complete search history.

(56) References Cited

U.S. PATENT DOCUMENTS

| | | | | |
|---|---|---|---|---|
| 2004/0181696 A1* | 9/2004 | Walker | ............... | H04L 63/0846 726/6 |
| 2007/0089163 A1* | 4/2007 | Denton | ............... | H04L 63/0428 726/2 |
| 2010/0264746 A1* | 10/2010 | Kazama | ................. | H02J 7/025 307/104 |
| 2011/0258251 A1* | 10/2011 | Antoci | ..................... | G06F 1/26 709/203 |
| 2013/0023241 A1* | 1/2013 | Lim | ..................... | H04W 12/06 455/411 |

(Continued)

FOREIGN PATENT DOCUMENTS

| | | |
|---|---|---|
| CN | 100463331 C | 2/2009 |
| CN | 101562360 A | 10/2009 |
| CN | 102760332 A | 10/2012 |

OTHER PUBLICATIONS

System Description, Wireless Power Transfer, vol. I: Low Power, Part 1: Interface Definition, Version 1.1.2, Jun. 2013.

(Continued)

*Primary Examiner* — Moustapha Diaby

(74) *Attorney, Agent, or Firm* — Winston Hsu

(57) ABSTRACT

A method of handling wireless charging authentication for an electronic device of a wireless charging system includes sending a first message to a controller of the wireless charging system to notify the controller that an authentication is required by a wireless charger of the wireless charging system; receiving a second message including authentication information from the controller; and sending a third message including the authentication information to the wireless charger, in order to satisfy the authentication.

18 Claims, 11 Drawing Sheets

(56) References Cited

U.S. PATENT DOCUMENTS

2013/0057206 A1 3/2013 Takahashi
2014/0361735 A1* 12/2014 Li .......................... H02J 7/025
　　　　　　　　　　　　　　　　　　　　　　　　　320/108

OTHER PUBLICATIONS

System Description, Wireless Power Transfer, vol. II: Medium Power, Part 1: Interface Definition, Version 0.9 rev 8, Sep. 2013.
Office action dated Sep. 23, 2016 for the China application No. 201510088384.1, filed date Feb. 26, 2015, p. 1-9.

* cited by examiner

METHOD OF HANDLING WIRELESS CHARGING AUTHENTICATION

CROSS REFERENCE TO RELATED APPLICATIONS

This application claims the benefit of U.S. Provisional Application No. 61/944,585, filed on Feb. 26, 2014 and entitled "Method and Apparatus of authentication relay for wireless charging systems", the contents of which are incorporated herein by reference.

BACKGROUND OF THE INVENTION

1. Field of the Invention

The present invention relates to a method utilized in a wireless charging system, and more particularly, to a method of handling wireless charging authentication utilized in a wireless charging system.

2. Description of the Prior Art

With the proliferation of portable electronic devices such as mobile devices, smart phones and tablet PCs, the demand for charging devices, especially for those provided in public areas, is increasing. In addition, people would like to get rid of annoying wires if possible. One technology which realizes this desire is wireless charging, in which portable electronic device(s) comprising a power receiver is placed on and charged through a wireless charger (e.g. a power base station comprising a power transmitter). Therefore, the current trend aims at providing wireless charging in public areas such as coffee shops, stores, train stations, airports, and restaurants, so that people may easily find a wireless power supply to charge their portable electronic devices.

Wireless Power Consortium (WPC) is a leading organization in the world to define wireless charging specifications. The document "Wireless Power Transfer—Volume I, part 1" and the document "Wireless Power Transfer—Volume II, part 1" define the interaction between a power base station (or a power transmitter) and a mobile device (or a power receiver).

However, all the existing protocol states are used for power charging and there is no consideration for other applications. The place which provides wireless charging cannot bill their customer for power charging, since there is no authentication in the protocol. In addition, the authentication may be provided from another device but interactions between this device and the power transmitter/receiver are not defined.

Thus, there is a need to implement authentication mechanism for wireless charging in order to meet the business requirement of deploying wireless charging services in public areas.

SUMMARY OF THE INVENTION

It is therefore an objective of the present invention to provide a method of handling wireless charging authentication utilized in a wireless charging system, in order to solve the abovementioned problem.

An embodiment of the present invention discloses a method of handling wireless charging authentication for an electronic device of a wireless charging system. The method comprises sending a first message to a controller of the wireless charging system to notify the controller that an authentication is required by a wireless charger of the wireless charging system; receiving a second message comprising authentication information from the controller; and sending a third message comprising the authentication information to the wireless charger, in order to satisfy the authentication.

An embodiment of the present invention further discloses a method of handling wireless charging authentication for a wireless charger of a wireless charging system. The method comprises making a request to an electronic device of the wireless charging system for an authentication when confirming that the electronic device connects to the wireless charger; receiving, from the electronic device, a first message comprising authentication information, which is generated by a controller in response to reception of a notification from the electronic device; and determining whether the authentication is successful according to the authentication information.

An embodiment of the present invention further discloses a method of handling wireless charging authentication for a controller of a wireless charging system. The method comprises receiving, from an electronic device of the wireless charging system, a first message which requests authentication information for an authentication required by a wireless charger of the wireless charging system; and sending a second message comprising the authentication information to the electronic device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
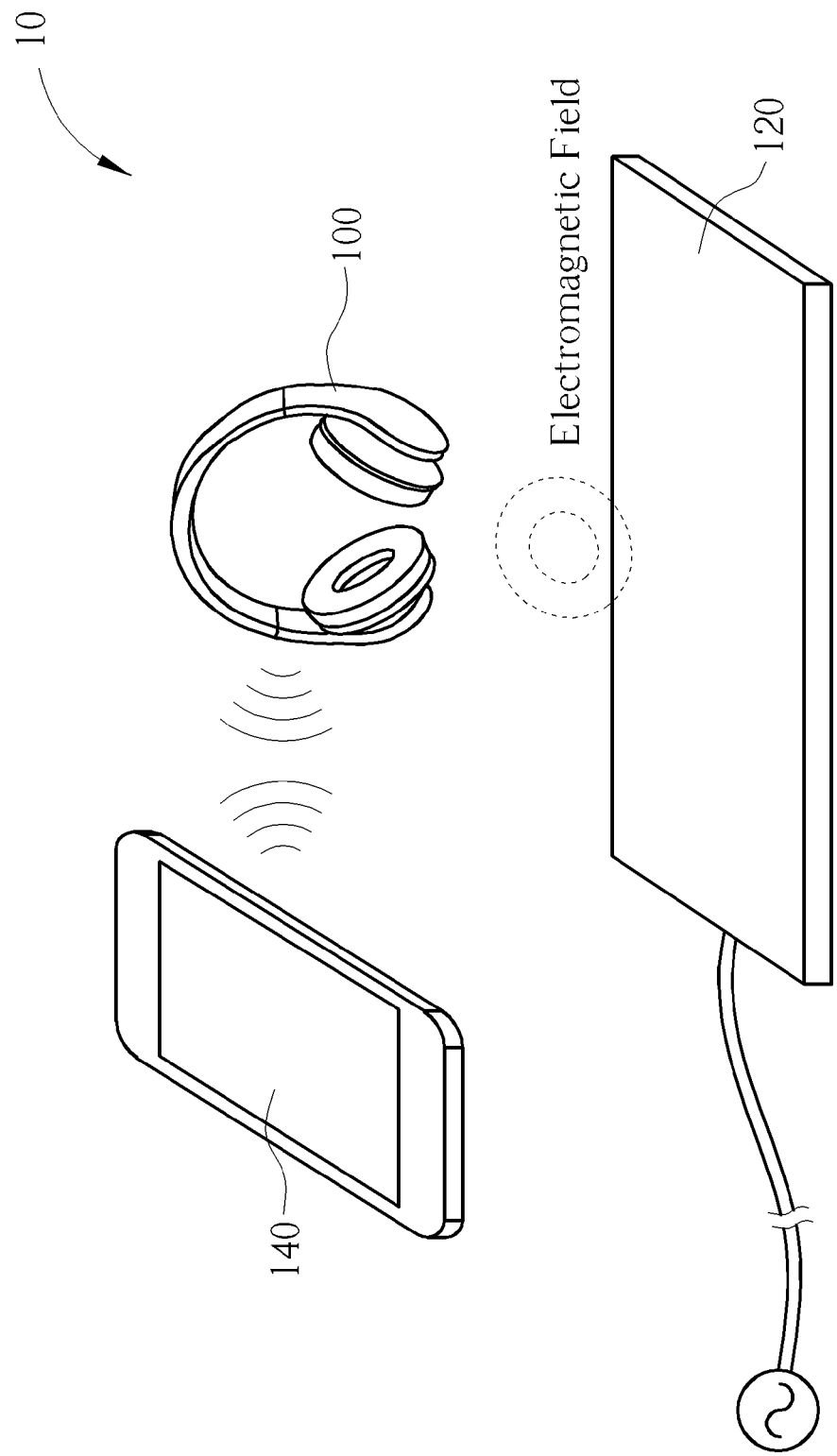
FIG. 1 is a schematic diagram of a wireless charging system according to an example of the present invention.

Please refer to FIG. 1, which is a schematic diagram of a wireless charging system 10 according to an example of the present invention. A wireless charging system may include at least one wireless charger and at least one electronic device that may be charged by the wireless charger. For simplicity, in FIG. 1, the wireless charging system 10 is briefly composed of an electronic device 100 and a wireless charger 120, and further includes a controller 140 for controlling the electronic device 100. The wireless charger 120 may represent a power base station (PBS), including a power transmitter or a power transmitting module with digital/analog chip(s), to supply wireless power to the electronic device 100. The electronic device 100 may be any portable electronic device such as a mobile phone, a laptop, a tablet computer, an electronic book, a portable computer system, or at least a power receiver or a power receiving module. Alternatively, the electronic device 100 may be any electronic device using battery as its power supply, such as a wearable computing device, a wearable medical device, a portable MP3 player, a headset, a smart watch or smart glasses. The electronic device 100 may directly attach to the wireless charger 120 or keep within a distance from the wireless charger 120 for wireless charging. As shown in FIG. 1, the electronic device 100 receives wireless power from the wireless charger 120 by electromagnetic induction so that the battery of the electronic device 100 is charged without using any wire connection.

In addition, the controller 140 may be any electronic device that may perform communication with the electronic device 100. More specifically, the controller 140 may provide authentication information for the electronic device 100, where the authentication information allows the electronic device 100 to be charged by the wireless charger 120. The controller 140 may be an electronic device that has an input interface allowing a user to input authentication information, where the electronic device may be, for example, a mobile phone, a laptop, a tablet computer, an electronic book, or a portable computer system, etc. Alternatively, the controller 140 may include a built-in authentication information generator, which is capable of generating authentication information allowing the electronic device 100 to be charged by the wireless charger 120. Note that the controller 140 controlling the electronic device 100 to be charged by the wireless charger 120 is only one of various embodiments of the present invention. In practice, the controller 140 may control at least one electronic device and allow each of the at least one electronic device to be charged by a wireless charger.

Figure 2:
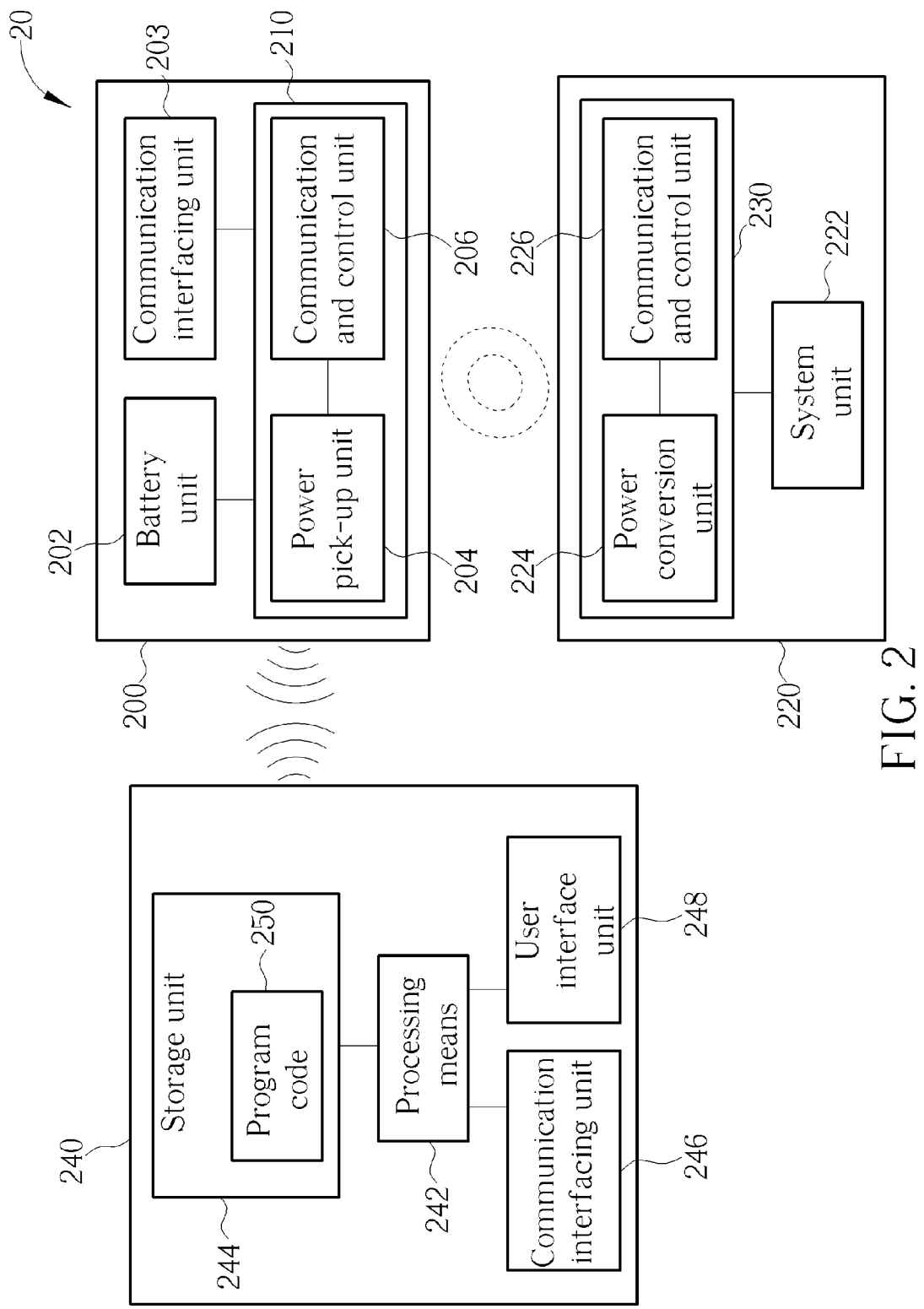
FIG. 2 is a functional block diagram of a wireless charging system according to an example of the present invention.

Please refer to FIG. 2, which is a functional block diagram of a wireless charging system 20 according to an example of the present invention. The wireless charging system 20 includes an electronic device 200, a wireless charger 220 and a controller 240. The electronic device 200 may be the electronic device 100 shown in FIG. 1, the wireless charger 220 may be the wireless charger 120 shown in FIG. 1, and the controller 240 may be the controller 140 shown in FIG. 1. The electronic device 200 includes a battery unit 202, a communication interfacing unit 203 and a power receiver 210. The power receiver 210 may include a power pick-up unit 204 used for receiving wireless power to charge the battery unit 202 and a communication and control unit 206 used for communicating, i.e., sending/receiving data, signals, messages and/or packets, with the wireless charger 220 via power signals or other communication media and controlling the operation of the power pick-up unit 204. The communication interfacing unit 203 is used for communicating, i.e., sending/receiving data, signals, messages and/or packets, with the controller 240. In some embodiments, the communication interfacing unit 203 may be implemented together with the communication and control unit 206, and is not limited herein.

The wireless charger 220 includes a power transmitter 230 and a system unit 222. The power transmitter 230 may include a power conversion unit 224 used for supplying wireless power and a communication and control unit 226 used for communicating, i.e., sending/receiving signals or packets, with the electronic device 200 and controlling the operation of the power conversion unit 224. The system unit 222 may include a processing means such as a microcontroller, microprocessor or an Application Specific Integrated Circuit (ASIC), for handling wireless charging authentication function activated by a processing result of the power transmitter 230. In the example of FIG. 2, the wireless charger 220 contains one power transmitter 230. In other examples, the wireless charger may contain multiple power transmitters for supplying wireless power to multiple portable electronic devices.

The controller 240 includes a processing means 242 such as a microprocessor or Application Specific Integrated Circuit (ASIC), a storage unit 244, a communication interfacing unit 246 and a user interface unit 248. The storage unit 244 may be any data storage device that may store a program code 250, accessed and executed by the processing means 242. Examples of the storage unit 244 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 246 is preferably a transceiver and is used to transmit and receive signals (e.g., data, signals, messages and/or packets) according to processing results of the processing means 242. The user interface unit 248 is used for performing interactions with a user, so the user may input authentication information for wireless charging of the electronic device 200 via the user interface unit 248. The controller 240 then communicates with the electronic device 200 via the communication interfacing unit 246. On the other hand, the user may not directly input the authentication information; instead, the user may input an instruction via the user interface unit 248 to instruct the processing means 242 to generate authentication information.

The communication and control units 206 and 226 preferably utilize an in-band communication channel for communication, in which communication channels are attached on wireless power signals. In an example, communication from the wireless charger 220 to the electronic device 200 may be carried out by using frequency-shift keying (FSK) modulation on the wireless power for transmission. In another example, communication from the electronic device 200 to the wireless charger 220 may rely on load modulation (LM). Alternatively, the communication and control units 206 and 226 may be implemented by radio transceivers that transmit and receive radio signals (e.g., messages, emails, or packets) in an out-of-band communication channel (e.g. a short-range communication protocol such as Bluetooth, Bluetooth Low Energy (BLE) or Wi-Fi).

Figure 3:
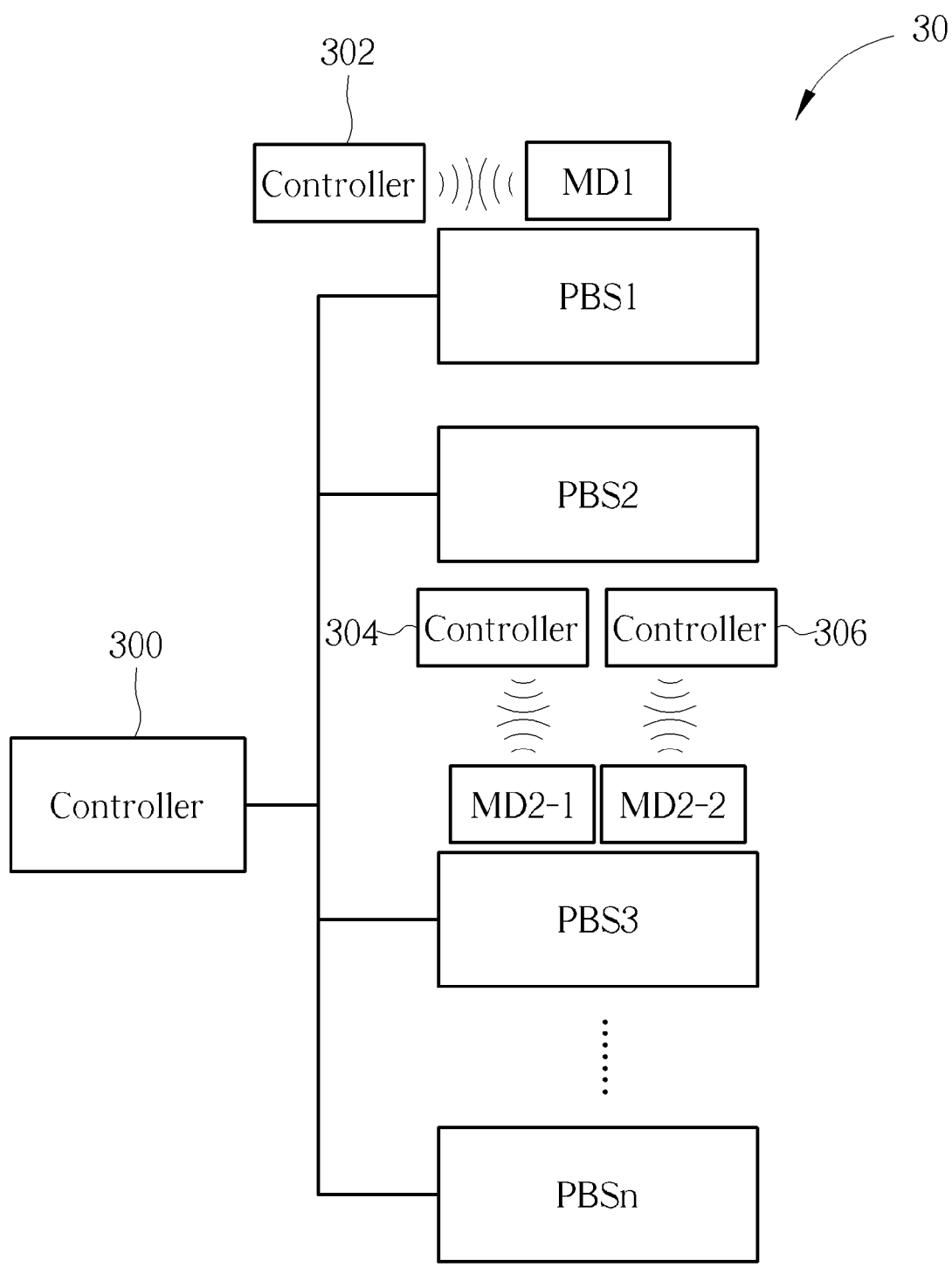
FIG. 3 is a schematic diagram of a wireless charging system in accordance with an example of the present invention.

FIG. 3 is a schematic diagram of a wireless charging system 30 in accordance with an example of the present invention. The wireless system 30 includes mobile devices MD1, MD2-1 and MD2-2, power base stations PBS1-PBSn, a controller 300 connected to each of the power base stations, and controllers 302, 304 and 306 respectively communicating with the mobile devices MD1, MD2-1 and MD2-2. The power base stations PBS1-PBSn may be deployed in areas such as coffee shops, stores, train stations, airports, and restaurants for public usage. The controller 300 may be a computer or a server at a control center or a front desk of the public area that monitors the usage or performs necessary computation for the power base stations PBS1-PBSn. In addition, if the user of a certain power base station encounters any problem, signals or messages related to the power base station may be sent to the controller 300 so that the staff at the control center or the front desk can provide timely assistance. Note that a wireless charger may be able to charge more than one electronic devices at the same time, as the example of the power base station PBS3 charging the mobile devices MD2-1 and MD2-2 shown in FIG. 3. Therefore, the signals or messages sent to the controller 300 may include necessary information (e.g. an identity of the mobile device) to distinguish the mobile devices MD2-1 and MD2-2 if only one of them encounters problem during wireless charging.

Please note that each of the mobile devices MD1, MD2-1 and MD2-2 may be a wearable device such as a headset or a smart watch that does not have a user interface. If authentication is necessary for wireless charging on the power base stations PBS1-PBSn, the authentication information for the mobile devices MD1, MD2-1 and MD2-2 should be provided from the controllers 302, 304 and 306, respectively. The controllers 302, 304 and 306 may be, for example, a mobile phone that may be utilized for inputting or generating the authentication information.

Figure 4:
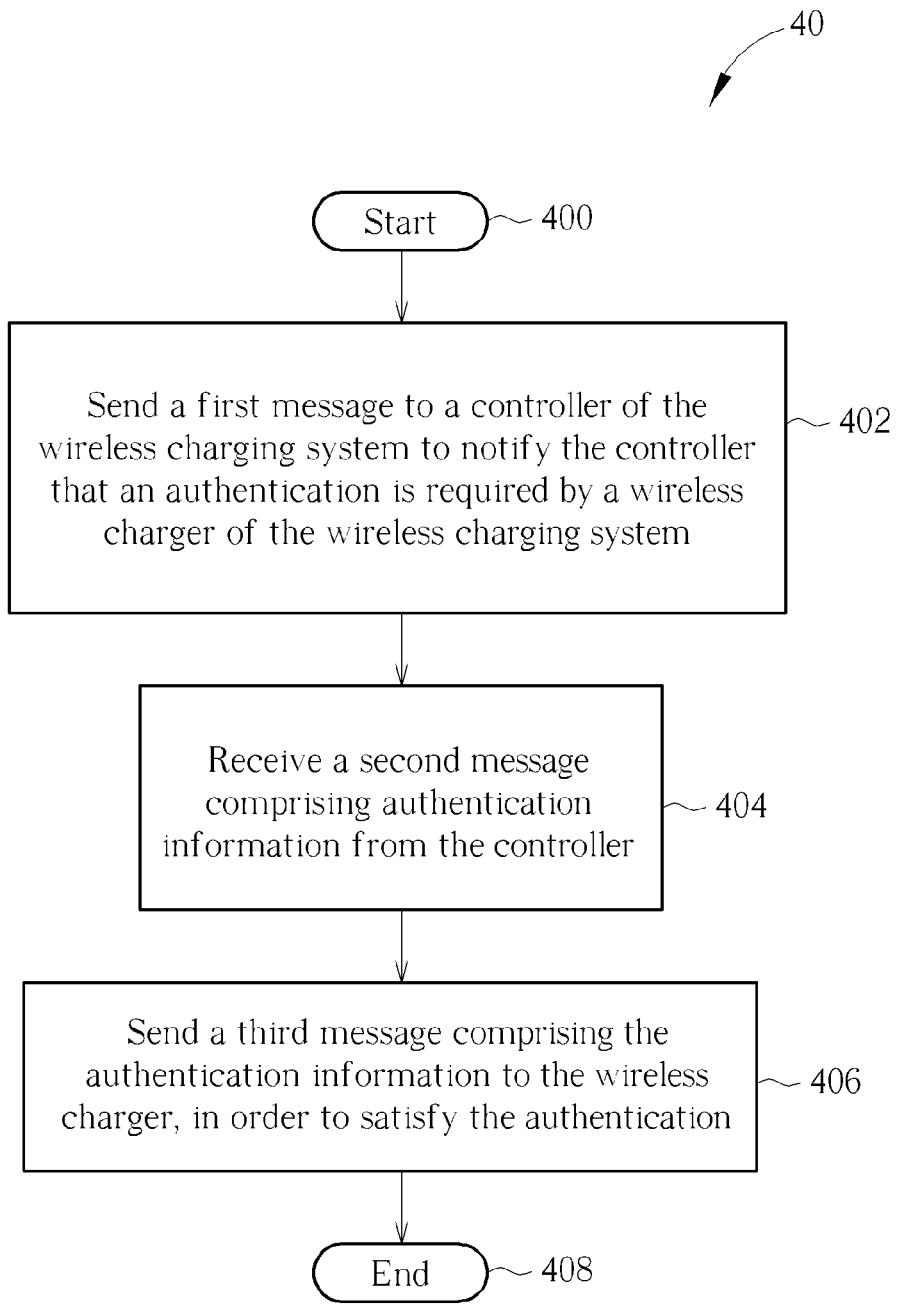
FIG. 4 is a flowchart of a process according to an example of the present invention.

Please refer to FIG. 4, which is a flowchart of a process 40 according to an example of the present invention. The process 40 may be utilized for an electronic device of a wireless charging system, such as the electronic device 100 shown in FIG. 1 or the electronic device 200 shown in FIG. 2, for handling wireless charging authentication. The process 40 may be implemented in the power receiver 210 and includes the following steps:

Step 400: Start.

Step 402: Send a first message to a controller of the wireless charging system to notify the controller that an authentication is required by a wireless charger of the wireless charging system.

Step 404: Receive a second message comprising authentication information from the controller.

Step 406: Send a third message comprising the authentication information to the wireless charger, in order to satisfy the authentication.

Step 408: End.

According to the process 40, when the electronic device is placed on or near the wireless charger, e.g., a power base station, the electronic device may receive an indication indicating that an authentication is required by the wireless charger. In response to reception of the indication, the electronic device may send a first message to the controller to notify that the authentication is required by the wireless charger. The controller may reply with the authentication information after receiving the first message. Therefore, a second message may be received by the electronic device from the controller, where the second message includes the authentication information allowing the electronic device to be charged by the wireless charger. Accordingly, the electronic device then sends a third message including the authentication information to the wireless charger, in order to satisfy the authentication.

In another case, the electronic device may receive the authentication information before receiving the indication indicating that the authentication is required. For example, the electronic device may send the first message to the controller when it is connected to the controller. The controller then responds with the second message including the authentication information, which may be used for the authentication required by the wireless charger in a later time. In this case, the electronic device may include a memory for storing the authentication information when the electronic device receives the second message (i.e., receives the authentication information) from the controller. After the electronic device is placed on or near the wireless charger to be charged by the wireless charger and recognizes that the authentication is required for the charging, the electronic device may satisfy the authentication with the stored authentication information.

Figure 5:
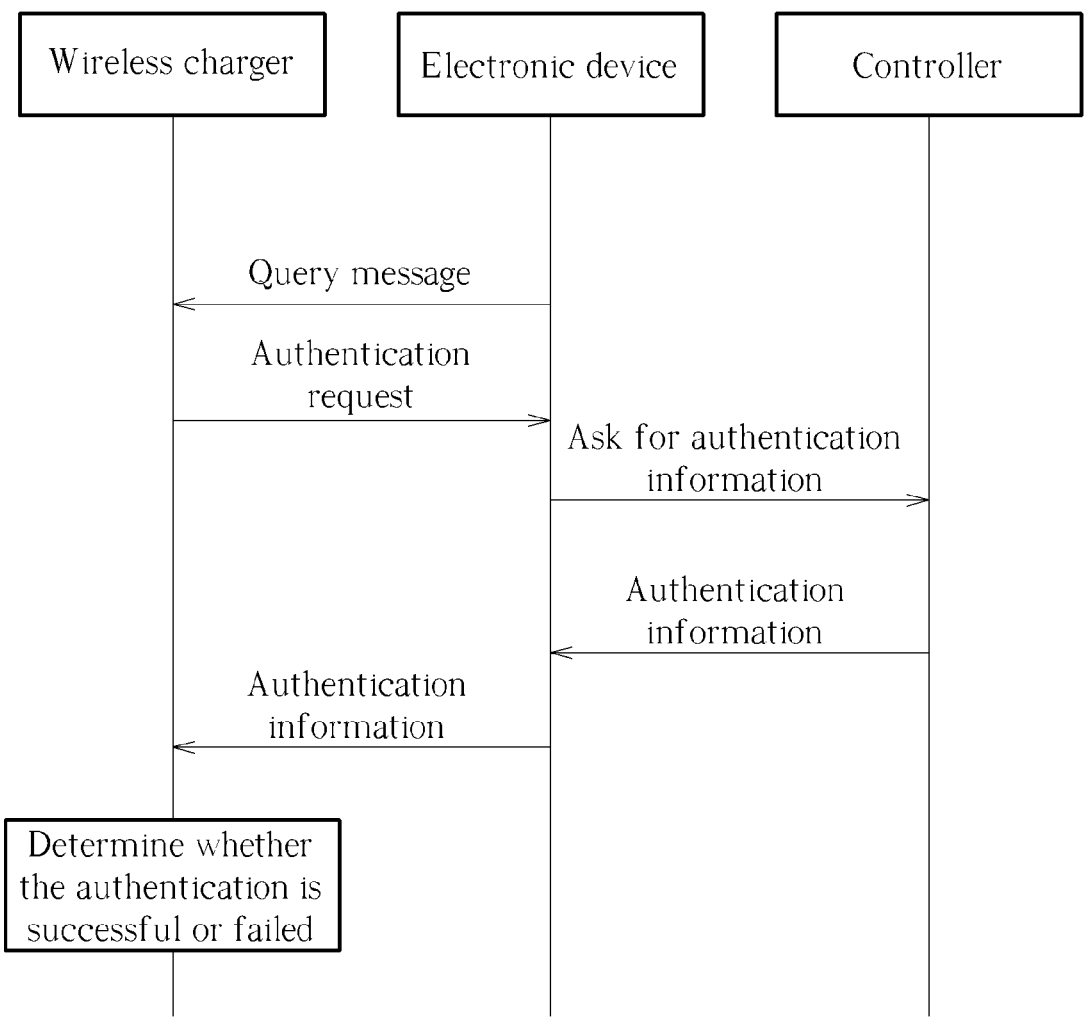
FIG. 5 is a schematic diagram of a message flow in the wireless charging system according to embodiments of the present invention.

Note that there are various methods for the electronic device to receive the indication and recognize that the authentication is required by the wireless charger. In an embodiment, the wireless charger may send a request message to the electronic device to notify that authentication is required. For example, please refer to FIG. 5, which is a schematic diagram of a message flow in the wireless charging system according to embodiments of the present invention. As shown in FIG. 5, when the wireless charger (e.g., a power base station) detects and confirms that an electronic device (e.g., a headset) connects to the wireless charger, the wireless charger may send an authentication request message to the electronic device, where the authentication request message includes information indicating that the authentication is required. The electronic device may send a message to a controller (e.g., a mobile phone) in response to the authentication request message to further ask for authentication information, and the controller may return (i.e., response) a message with the authentication information. The electronic device then sends the authentication information to the wireless charger, in order to satisfy the authentication required by the wireless charger. Therefore, the wireless charger may determine whether the authentication is successful or failed according to the received authentication information, and determine whether to supply wireless power to the electronic device accordingly.

The above embodiment describes the scenario where the wireless charging authentication procedure is initiated by the wireless charger. In some cases, the wireless charging authentication procedure (or the communication) may be initiated by the electronic device. Please keep referring to FIG. 5 for another embodiment. The electronic device first sends a query message to the wireless charger to explicitly ask whether the authentication is needed. In response, the wireless charger may send a response message to the electronic device to indicate whether the authentication is needed or not. If the electronic device receives the response message indicating that the authentication is needed as the case shown in FIG. 5, the electronic device may send an authentication request message to the controller. The subsequent operations of the message flow shown in FIG. 5 are detailed in the above paragraphs, and will not be detailed herein.

Please note that, in the above embodiments, the communication between the wireless charger and the electronic device is bidirectional; that is, the electronic device may send messages to the wireless charger as well as receive messages from the wireless charger. In another embodiment, the wireless charging system only supports unidirectional communication between the wireless charger and the electronic device; that is, the electronic device may send messages to the wireless charger but the wireless charger may not reply with any messages. In such a condition, the wireless charger may not inform the electronic device of the authentication requirement by sending any message.

Figure 6:
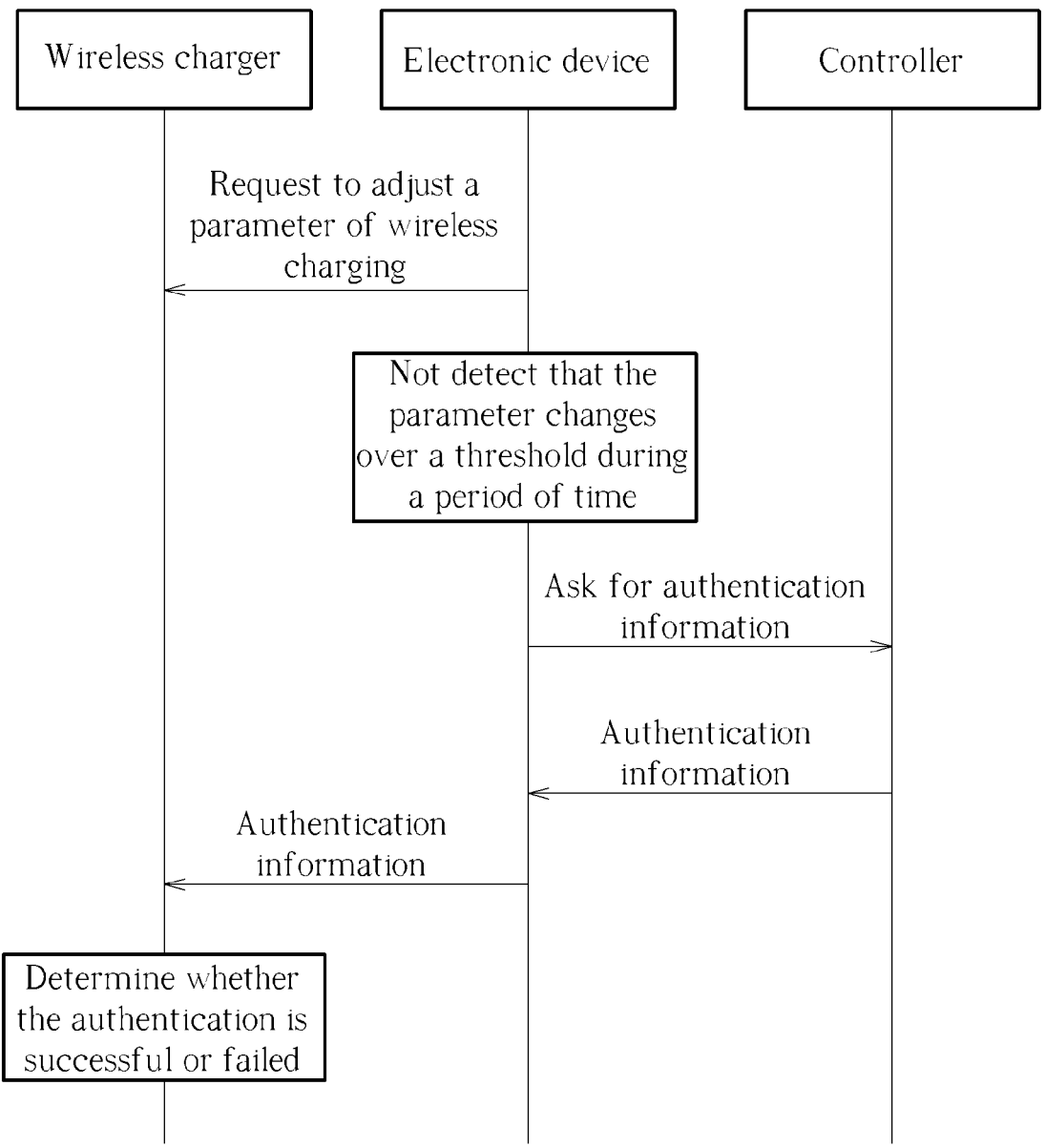
FIG. 6 is a schematic diagram of a message flow with unidirectional communication between the wireless charger and the electronic device.

Please refer to FIG. 6, which is a schematic diagram of a message flow with unidirectional communication between the wireless charger and the electronic device. As shown in FIG. 6, the wireless charging system does not support the communication channel direction from the wireless charger to the electronic device. In order to know whether the wireless charging authentication is required, the electronic device may send a message or a packet (e.g., a control error packet or reconfiguration packet) to request the wireless charger to adjust/increase/decrease/reconfigure a parameter (e.g., voltage, current, amplitude, duty cycle, frequency, or power in watt) of the wireless power. In this case, the wireless charger may not reply with any message, and the wireless charger just adjusts the corresponding parameter or not based on whether the authentication is satisfied. The electronic device then detects if there is any change in the parameter of the wireless power. If the electronic device does not detect that the parameter changes over a threshold during a period of time as the case shown in FIG. 6, the electronic device determines that wireless charging authentication is needed and asks the controller for authentication information. The subsequent operations of the message flow shown in FIG. 6 are detailed in the above paragraphs, and will not be detailed herein.

The authentication information may be included in the message sent by the electronic device to the wireless charger via an in-band communication channel or an out-of-band communication channel. In the case where the out-of-band communication channel is applied, the wireless charger may start supplying wireless power if the authentication succeeds. If the authentication fails, the wireless charger may avoid supplying wireless power and may release a warning signal. In the case where the in-band communication channel is applied, the wireless charger has already supplied wireless power before receiving the authentication information. In such a condition, the wireless charger keeps on supplying wireless power if the authentication succeeds. If the authentication fails, the wireless charger may stop supplying wireless power and may release a warning signal. In this manner, the service of wireless charging is under control.

Please note that the authentication information may include a security code, a password, full or partial of an identity of the controller, full or partial of an identity of the electronic device, an input to the controller, information indicating that a user of the controller has completed a certain operation on the controller (e.g. the user had clicked an advertisement link), and a service code denoting a level of service that the wireless charger provides. The security code and the password may be represented by a series of bits, any possible input to the controller such as a plot and a series of numbers, or an image (e.g. user's face or fingerprint) recognized by the controller. The identity of the controller may be a unique ID of the controller (e.g., a cellphone), which may be determined by the manufacturer of the controller. The identity of the electronic device may be a unique ID of the power receiver (e.g., the power receiver 210) equipped in the electronic device. This identity may be determined by the manufacturer of the power receiver, such as the device ID which includes Manufacture Code and (Basic/Extended) Device Identifier. Alternatively, the identity of the electronic device or the controller may be provided by other modules in the electronic device or the controller. In an example, it may be the International Mobile Subscriber Identity (IMSI) or the Radio Network Temporary Identifier (RNTI) from cellular modules in the controller. In another example, it may be the Near Field Communication (NFC) or Bluetooth Low Energy (BLE) ID from NFC or Bluetooth modules in the controller. The identity of the electronic device or the controller which is represented by the identity of modules other than the receiver module may be encoded (e.g. scrambled, truncated) before being sent to the wireless charger as the authentication information.

Furthermore, the authentication information may be a service code denoting a level of service that the wireless charger provides. The level of service may represent a charging current level, charging voltage level, wireless power level, or charging speed, etc. Since different electronic devices may require different charging current levels or wireless power levels, the authentication information may include information indicating the service level suitable for the electronic device, in order to notify the wireless charger to supply appropriate service level for the electronic device. Alternatively, the level of service may correspond to a payment from the user of the controller. For example, if a higher payment is received from the user, the authentication information may instruct the wireless charger to provide a higher level of service.

Please note that the wireless charger may determine whether the authentication is successful or failed by any method. In an embodiment, a timer may be configured in the wireless charger at the beginning of the wireless charging procedure to wait for the authentication information. If the wireless charger does not receive the message including authentication information for a predefined duration, the wireless charger may determine that the authentication is failed. On the other hand, if the wireless charger receives the message including authentication information within the predefined duration, the wireless charger may further check whether the authentication is successful or failed according to the received authentication information.

The wireless charger may determine whether the authentication is successful or not by comparing the received authentication information with data stored in a memory of the wireless charger. In other words, the wireless charger compares the received authentication information (e.g. a password) with the authentication information data (e.g. a referenced password) stored in its memory. If the authentication information matches with the data, the authentication is determined to be successful. If the authentication information does not match with the data, the authentication is determined to be failed.

In another aspect, the wireless charger may determine whether the authentication is successful or not by manipulating the received authentication information and checking if a value derived from manipulation of the received authentication information equals a predefined value. In a case when the authentication information is a number, for example, the wireless charger may take modulo operation on the number by a predetermined number. If the remainder matches a specific number, the authentication is determined to be successful; otherwise, the authentication is determined to be failed.

The above descriptions illustrate examples where the wireless charger verifies the authentication information locally. In some cases, the wireless charger may be managed by a remote device so that the authentication information may be processed in the remote device instead. In such a situation, the wireless charger may send the received authentication information to a controller (e.g., the controller 300 as shown in FIG. 3) of the wireless charging system for determining whether the authentication is successful or not by the controller. The controller may perform manipulation on the authentication information and compare to check if the derived value equals the predefined value. Then, the controller may send the determination result corresponding to the authentication information back to the wireless charger.

Figure 7:
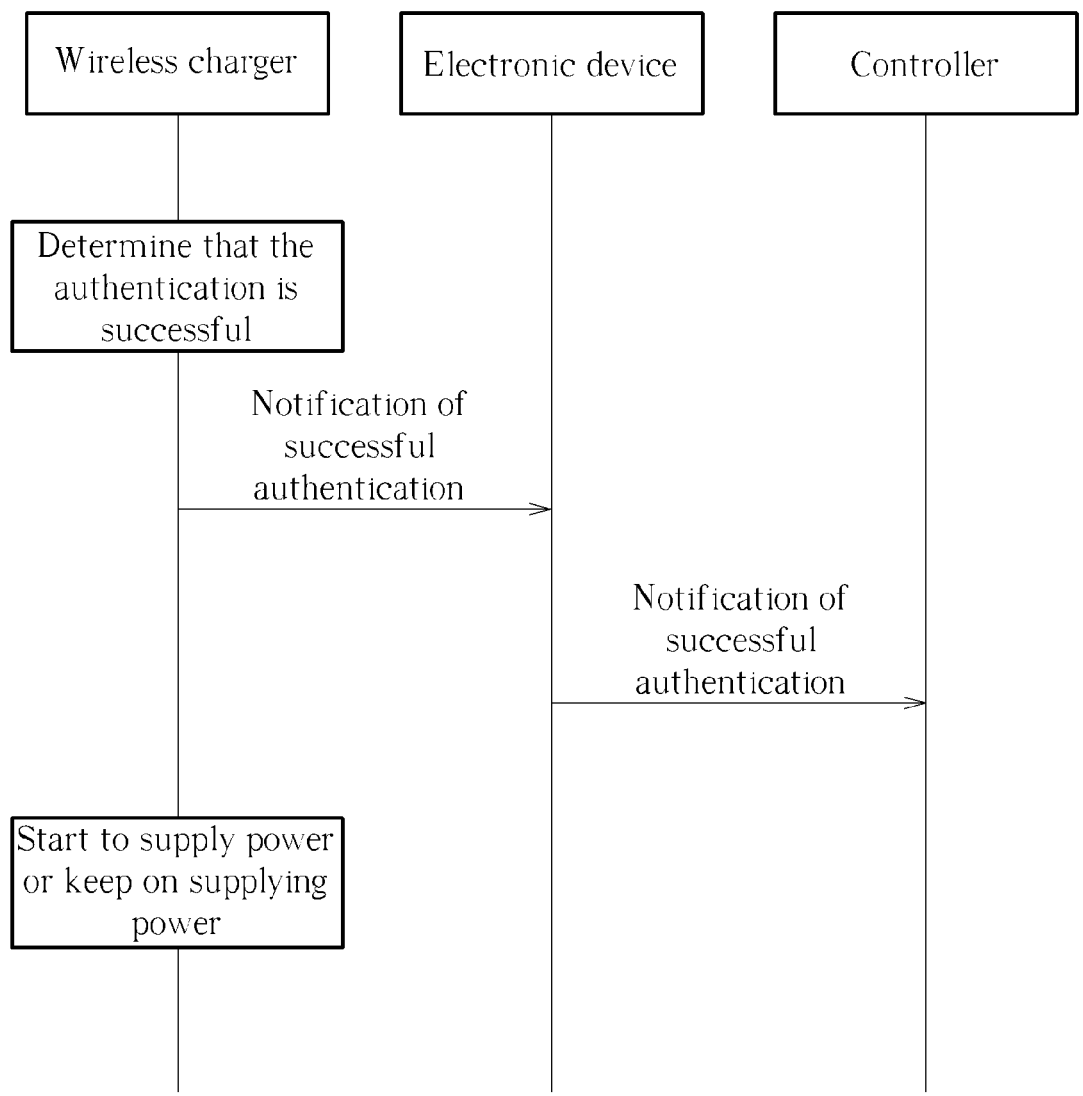
FIG. 7 is a schematic diagram of a message flow according to an embodiment where the wireless charger determines that the authentication is successful.

Please refer to FIG. 7, which is a schematic diagram of a message flow according to an embodiment where the wireless charger determines that the authentication is successful. As shown in FIG. 7, when the wireless charger determines that the authentication is successful, the wireless charger may send a message to the electronic device to notify that the authentication is successful, and start to supply power or keep on supplying power to the electronic device based on whether the messages between the wireless charger and the electronic device is transmitted via an out-of-band communication channel or an in-band communication channel. After receiving the message indicating that the authentication is successful, the electronic device may send another message to the controller to notify that the authentication is successful.

Figure 8:
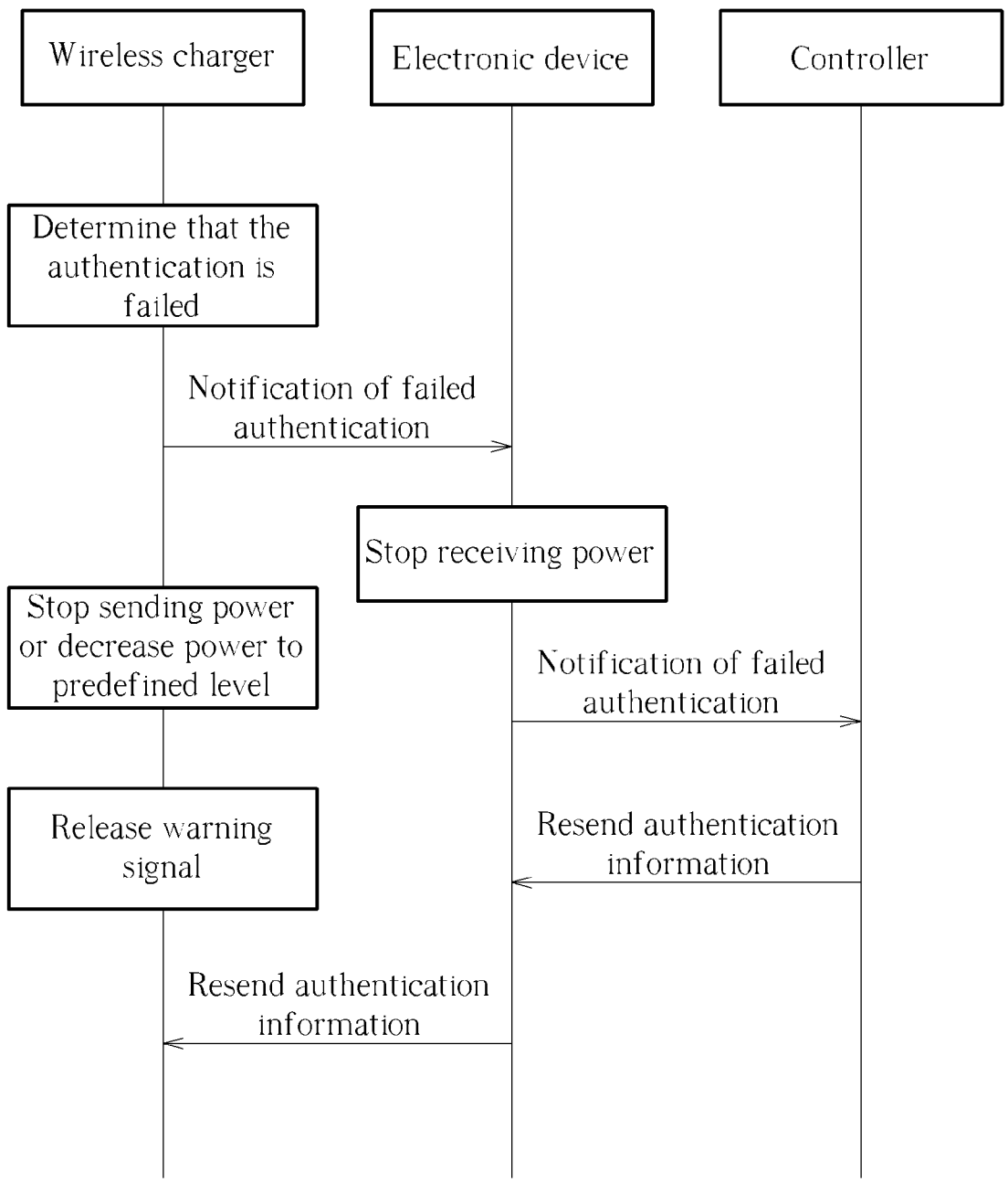
FIG. 8 is a schematic diagram of a message flow according to an embodiment where the wireless charger determines that the authentication is failed.

Please refer to FIG. 8, which is a schematic diagram of a message flow according to an embodiment where the wireless charger determines that the authentication is failed. As shown in FIG. 8, when the wireless charger determines that the authentication is failed, the wireless charger may send a message to the electronic device to notify that the authentication is failed. The wireless charge then stops sending power to the electronic device and may release a warning signal, which may bring immediate attentions of the surrounding people. The warning signal may be in any forms such as voice, speech, audio, image, and/or video. In an embodiment, the wireless charger may decrease the wireless power to a predefined level (e.g., an extremely low level) instead of entirely stopping sending power, in order to allow the electronic device to resend the authentication information via the in-band communication channel. After receiving the message indicating that the authentication is failed, the electronic device may stop receiving power from the wireless charger and send another message to the controller to indicate that the authentication is failed.

In an embodiment, the electronic device may resend the authentication information to the wireless charger when recognizing that the authentication is failed, as shown in FIG. 8. More specifically, the electronic device may either resend the same message or send another message including the authentication information to the wireless charger after receiving the message having information indicating that the authentication is failed. For example, the electronic device may resend a password having the same packet format, or send the password with another packet format configuration such as incremental encoding or different times of repetition. Note that the electronic device may resend the authentication information to the wireless charger more than one times.

Furthermore, in response to reception of the message indicating that the authentication is failed, the controller may resend the authentication information to the electronic device, as shown in FIG. 8. More specifically, the controller may either resend the same message or send another message including the authentication information to the electronic device after receiving the message having information indicating that the authentication is failed. The electronic device then forwards the authentication information to the wireless charger. Also note that the controller may resend the authentication information to the electronic device more than one times.

In an embodiment, the authentication information may include a service code denoting a level of service that the wireless charger provides. In such a condition, the authentication information may indicate a service level requested for the electronic device. After receiving the authentication information, the wireless charger may adjust parameter (s) of wireless charging (e.g., supplying power level, charging current level and/or charging speed) according to the received authentication information if the authentication is satisfied, e.g., the required payment for the service level is received.

Figure 9:
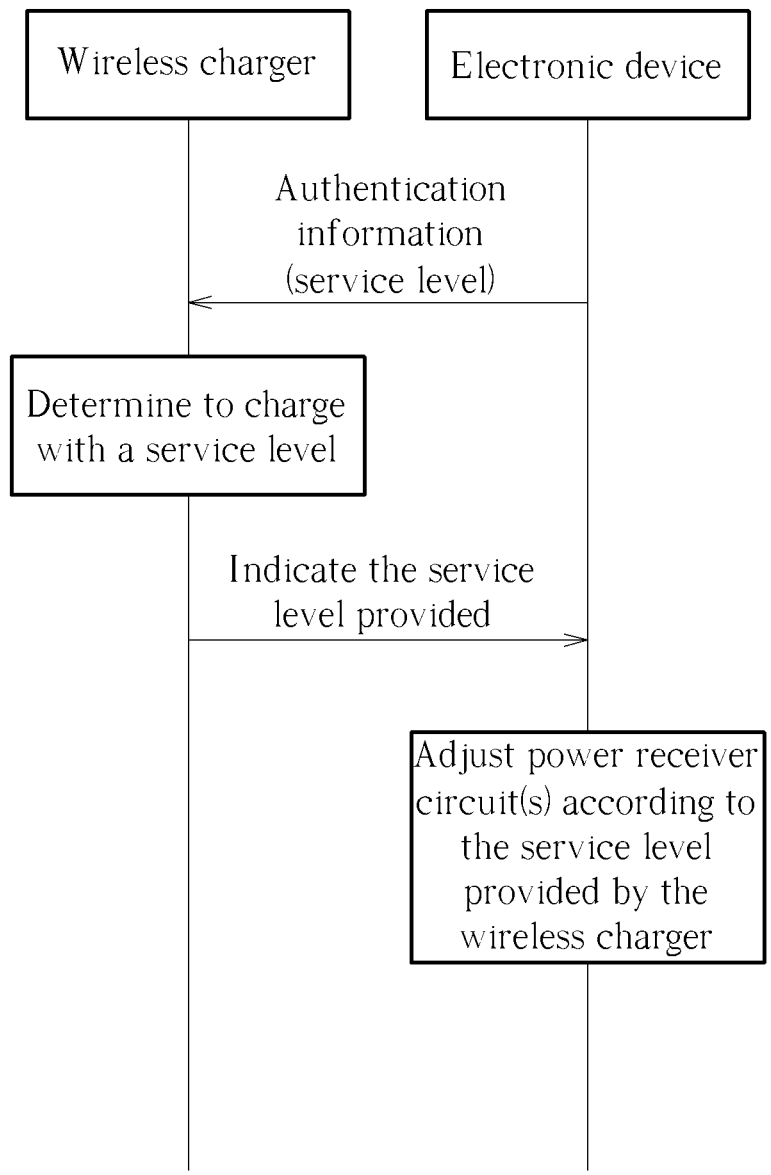
FIG. 9 is a schematic diagram of a message flow according to an embodiment of the present invention.

It should be noted that, after the wireless charger receives the authentication information indicating a service level, the wireless charger may or may not perform wireless charging with the service level indicated by the authentication information. In several cases, the service level requested for the electronic device may not be provided, since the payment for the requested service level may not be enough or the wireless charger may not possess enough charging capability. If the wireless charger does not perform wireless charging in accordance with the service level requested by the authentication information, the wireless charger may further send a message to notify the electronic device. This message should indicate the service level provided by the wireless charger, and may include information related to the reason of rejection of the requested service level. Therefore, the electronic device may adjust its power receiver circuit (s) (e.g., the power receiver 210) according to the service level provided by the wireless charger. The message flow of this example is shown in FIG. 9.

In order to allow the electronic device to have enough time for requesting the authentication information from the controller, the electronic device may send a message to the wireless charger to request time extension for the authentication. The wireless charger may expect that the electronic device generates the authentication information itself since the electronic device may generally be a mobile phone that can receive a password input and generate a password immediately; hence, a timer of the wireless charger may be configured with enough time for the mobile phone to send the authentication information. If the authentication information needs to be obtained from an external controller, the electronic device may need more time for requesting the authentication information from the controller, and thereby sends the message for requesting time extension to the wireless charger. In such a condition, the wireless charger may adjust the timer to extend the waiting time for authentication information.

Figure 10:
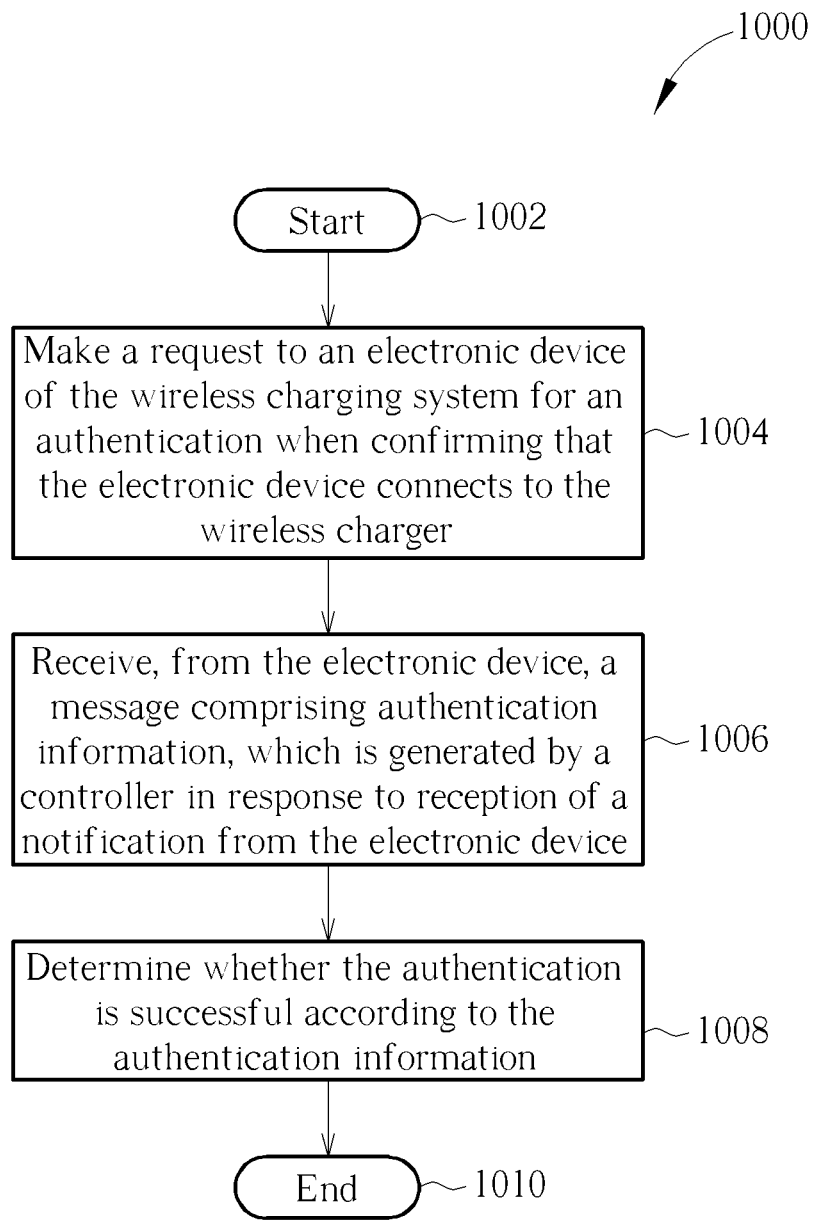
FIG. 10 is a flowchart of a process according to an example of the present invention.

Operations and descriptions related to the wireless charger in the process 40 can be summarized into a process 1000, as shown in FIG. 10. The process 1000 may be utilized for a wireless charger of a wireless charging system, such as the wireless charger 120 shown in FIG. 1 or the wireless charger 220 shown in FIG. 2, for handling wireless charging authentication. The process 1000 may be implemented in the power transmitter 230 and includes the following steps:

Step 1002: Start.

Step 1004: Make a request to an electronic device of the wireless charging system for an authentication when confirming that the electronic device connects to the wireless charger.

Step 1006: Receive, from the electronic device, a message comprising authentication information, which is generated by a controller in response to reception of a notification from the electronic device.

Step 1008: Determine whether the authentication is successful according to the authentication information.

Step 1010: End.

Although detailed operations of the process 1000 are already illustrated in the above descriptions related to the process 40 in FIG. 4, some possible examples for realizing the process 1000 are further illustrated as follows.

For example, the wireless charger may further perform communication with another controller of the wireless charging system such as the controller 300 shown in FIG. 3. This controller may manage a specific number of wireless chargers such as the power base stations PBS1-PBSn deployed in coffee shops, stores, train stations, airports or restaurants. If the authentication succeeds, the wireless charger may send an authentication success message to the controller to inform that the authentication for the electronic device succeeds. The authentication success message may include at least one of the following: an identity of the electronic device, an identity of the wireless charger, and a location of the wireless charger or the electronic device. For example, the authentication success message may include the serial number of a power base station to indicate which power base station will start to supply power to an electronic device. If the authentication fails, the wireless charger may send an authentication failure message to the controller to inform that the authentication for the electronic device fails. The authentication failure message may include not only the identities and/or locations of the electronic device and/or the wireless charger as mentioned above, but also the reason of authentication failure.

Figure 11:
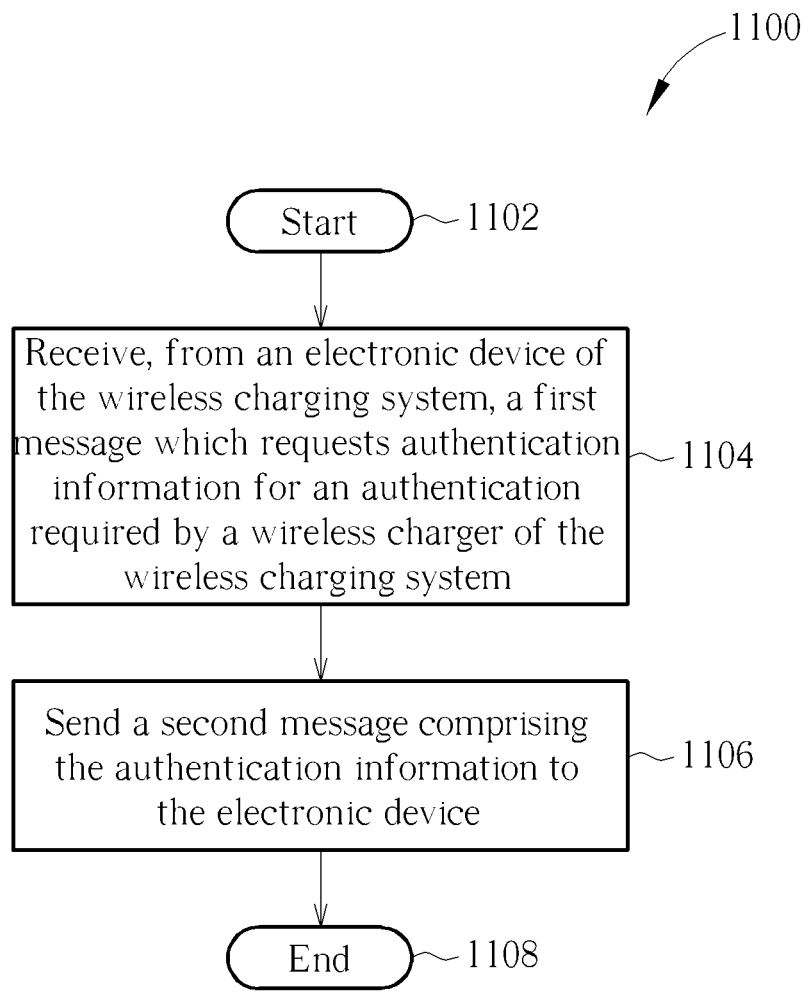
FIG. 11 is a flowchart of a process according to an example of the present invention.

On the other hand, operations and descriptions related to the controller in the process 40 can be summarized into a process 1100, as shown in FIG. 11. The process 1100 may be utilized for a controller of a wireless charging system, such as the controller 140 shown in FIG. 1 or the controller 240 shown in FIG. 2, for handling wireless charging authentication. The process 1100 may be implemented in the processing means 242 and includes the following steps:

Step 1102: Start.

Step 1104: Receive, from an electronic device of the wireless charging system, a first message which requests authentication information for an authentication required by a wireless charger of the wireless charging system.

Step 1106: Send a second message comprising the authentication information to the electronic device.

Step 1108: End.

In general, the wireless charging authentication procedure of the present invention is used for an electronic device that does not have an input interface to input passwords and may not generate passwords itself. This electronic device may be a wearable device such as a headset, a smart watch or smart glasses, but this should not be a limit of the present invention. In an example, a user in a coffee shop may need to charge his/her mobile phone MP1 but the mobile phone MP1 does not have authority to pay for the wireless charging service in the coffee shop. In such a condition, the user may borrow another mobile phone MP2 to pay for the wireless charging service if the mobile phone MP2 may access an account having a prepaid payment. Therefore, the mobile phone MP1 may be regarded as the electronic device to be charged and the mobile phone MP2 may be regarded as the controller which provides the authentication information.

If the wireless charging authentication procedure completes and the authentication fails, the wireless charging system may restart the protocol cycle from the beginning. For example, in a wireless charging system conforming to the Wireless Power Consortium (WPC) specification, the wireless charging system may rewind to the selection phase to start over the protocol cycle. Alternatively, the wireless charging system may go back to one of the previous protocol phases (e.g. ping phase, identification and configuration phase, or negotiation phase).

Those skilled in the art should readily make combinations, modifications and/or alterations on the abovementioned description and examples. The abovementioned steps of the processes including suggested steps may be realized by means that could be a hardware, a firmware known as a combination of a hardware device and computer instructions and data that reside as read-only software on the hardware device, or an electronic system. Examples of hardware may include analog, digital and mixed circuits known as microcircuit, microchip, or silicon chip. Examples of the electronic system may include a system on chip (SOC), system in package (SiP), a computer on module (COM), and the wireless charging system 20.

To sum up, the present invention provides a method of handling wireless charging authentication in a wireless charging system. A controller is capable of providing authentication information to an electronic device such as a wearable device that may not have an input interface to input authentication information and may not generate authentication information itself, to allow the electronic device to receive wireless power from a wireless charge. Therefore, the electronic device may receive power from the wireless charger according to the authentication information obtained from the controller.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling wireless charging authentication for an electronic device of a wireless charging system, comprising:

the electronic device sending a first message to a controller of the wireless charging system to notify the controller that an authentication is required by a wireless charger of the wireless charging system;

the electronic device receiving a second message comprising authentication information from the controller;

the electronic device sending a third message comprising the authentication information to the wireless charger, in order to satisfy the authentication; and the electronic device receiving, from the wireless charger, a fourth message comprising information indicating whether the authentication is successful.

2. The method of claim 1, further comprising:

the electronic device receiving wireless power from the wireless charger before sending the third message comprising the authentication information to the wireless charger.

3. The method of claim 1, further comprising:

the electronic device stopping receiving power from the wireless charger and resending the third message or sending another message comprising the authentication information to the wireless charger after receiving the fourth message comprising information indicating that the authentication is failed.

4. The method of claim 1, further comprising:

the electronic device sending a fifth message to the controller to indicate whether the authentication is successful.

5. The method of claim 1, further comprising:

the electronic device receiving an indication indicating that the authentication is required by the wireless charger.

6. The method of claim 5, wherein the step of receiving the indication indicating that the authentication is required by the wireless charger comprises:
the electronic device receiving, from the wireless charger, a request message comprising information indicating that the authentication is required.

7. The method of claim 6, further comprising:
the electronic device sending a query message to the wireless charger to ask whether the authentication is required before receiving the request message.

8. The method of claim 5, wherein the step of receiving the indication indicating that the authentication is required by the wireless charger comprises:
the electronic device sending a sixth message to the wireless charger to request the wireless charger to adjust a parameter of wireless charging; and
the electronic device determining that the authentication is required by the wireless charger when detecting that the parameter does not change during a period of time.

9. The method of claim 1, further comprising:
the electronic device sending a seventh message to the wireless charger to request a time extension for the authentication.

10. The method of claim 1, wherein the authentication information comprises at least one of a security code, a password, full or partial of an identity of the controller, full or partial of an identity of the electronic device, an input to the controller, information indicating that a user of the controller has completed a certain operation on the controller, and a service code denoting a level of service that the wireless charger provides.

11. The method of claim 1, further comprising:
the electronic device storing the authentication information in a memory of the electronic device when receiving the second message from the controller.

12. A method of handling wireless charging authentication for a controller of a wireless charging system, comprising:
the controller receiving, from an electronic device of the wireless charging system, a first message which requests authentication information for an authentication required by a wireless charger of the wireless charging system;
the controller sending a second message comprising the authentication information to the electronic device; and
the controller receiving, from the electronic device, a third message comprising information indicating whether the authentication is successful, wherein the third message is transmitted from the wireless charger to the electronic device.

13. The method of claim 12, further comprising:
the controller resending the second message or sending another message comprising the authentication information to the electronic device after receiving the third message comprising information indicating that the authentication is failed.

14. The method of claim 12, wherein the authentication information comprises at least one of a security code, a password, full or partial of an identity of the controller, full or partial of an identity of the electronic device, an input to the controller, information indicating that a user of the controller has completed a certain operation on the controller, and a service code denoting a level of service that the wireless charger provides.

15. A method of handling wireless charging authentication for a wireless charger of a wireless charging system, comprising:
the wireless charger making a request to an electronic device of the wireless charging system for an authentication when confirming that the electronic device connects to the wireless charger;
the wireless charger receiving, from the electronic device, a first message comprising authentication information, which is generated by a controller of the wireless charging system in response to reception of a notification from the electronic device;
the wireless charger determining whether the authentication is successful according to the authentication information; and
the wireless charger sending a second message comprising information indicating whether the authentication is successful to the electronic device.

16. The method of claim 15, wherein the step of making the request to the electronic device for the authentication when confirming that the electronic device connects to the wireless charger comprises:
the wireless charger sending, to the electronic device, a request message comprising information indicating that the authentication is required.

17. The method of claim 15, wherein the step of making the request to the electronic device for the authentication when confirming that the electronic device connects to the wireless charger comprises:
the wireless charger receiving, from the electronic device, a third message which requests the wireless charger to adjust a parameter of wireless charging; and
the wireless charger determining whether to adjust the parameter according to whether the authentication is satisfied.

18. The method of claim 15, further comprising:
the wireless charger receiving, from the electronic device, a fourth message which requests a time extension for the authentication.

* * * * *